US008862275B2

(12) United States Patent
Runge et al.

(10) Patent No.: US 8,862,275 B2
(45) Date of Patent: *Oct. 14, 2014

(54) INTELLIGENT ENVIRONMENTAL SENSOR FOR IRRIGATION SYSTEMS

(75) Inventors: Thomas H. Runge, Manasquan, NJ (US); Bruce M. Downie, Hopewell, NJ (US)

(73) Assignee: The Toro Company, Bloomington, MN (US)

(*) Notice: Subject to any disclaimer, the term of this patent is extended or adjusted under 35 U.S.C. 154(b) by 796 days.

This patent is subject to a terminal disclaimer.

(21) Appl. No.: 13/157,253

(22) Filed: Jun. 9, 2011

(65) Prior Publication Data

US 2011/0238230 A1    Sep. 29, 2011

Related U.S. Application Data

(63) Continuation of application No. 12/855,615, filed on Aug. 12, 2010, now Pat. No. 7,962,245, which is a continuation of application No. 12/104,937, filed on Apr. 17, 2008, now Pat. No. 7,912,588, which is a continuation of application No. 11/314,451, filed on Dec. 20, 2005, now Pat. No. 7,363,113, which is a continuation of application No. 10/690,694, filed on Oct. 22, 2003, now Pat. No. 7,010,394.

(60) Provisional application No. 60/421,613, filed on Oct. 24, 2002.

(51) Int. Cl.
*G06F 19/00* (2011.01)
*A01G 25/16* (2006.01)

(52) U.S. Cl.
CPC .................................... *A01G 25/167* (2013.01)
USPC ............................................. 700/282; 239/69

(58) Field of Classification Search
USPC ............................................. 700/284; 239/69
See application file for complete search history.

(56) References Cited

U.S. PATENT DOCUMENTS

| 2,688,056 | A | 8/1954 | Kettering et al. |
| 3,808,385 | A | 4/1974 | Klinefelter |
| 4,064,507 | A | 12/1977 | Schmitz |
| 4,264,902 | A | 4/1981 | Miller |
| 4,313,042 | A | 1/1982 | Ehrhart |
| 4,394,603 | A | 7/1983 | Widmayer |
| 4,396,149 | A | 8/1983 | Hirsch |

(Continued)

OTHER PUBLICATIONS

United States Patent and Trademark Office, Notice of Allowance mailed Mar. 2, 2011 in U.S. Appl. No. 12/855,615, 10 pages.

(Continued)

*Primary Examiner* — Michael D Masinick
(74) *Attorney, Agent, or Firm* — Inskeep IP Group, Inc.

(57) ABSTRACT

The invention provides a regulator system for regulating the operation of an irrigation system which is responsive to user programmed information. It has a control element for issuing watering control signals to an irrigation system, having at least one of (i) a duration programming device for programming a minimum amount of time and a maximum amount of time for the suspension of watering by the irrigation system, and (ii) a user adjustable temperature programming device for programming a minimum allowed temperature for initiating a watering period by the irrigation system. It further has an irrigation system interface for connecting said control element with the irrigation system. It also has a switch for conveying the control signals from the control element to the irrigation system via the irrigation system interface, for either permitting or prohibiting watering by the irrigation system, responsive to the control signals generated by and received from the control element.

18 Claims, 10 Drawing Sheets

(56) References Cited

U.S. PATENT DOCUMENTS

| | | | |
|---|---|---|---|
| 4,655,076 A | 4/1987 | Weihe et al. |
| 4,684,920 A | 8/1987 | Reiter |
| 4,718,185 A | 1/1988 | Conlin et al. |
| 4,760,547 A | 7/1988 | Duxbury |
| 4,862,701 A | 9/1989 | Small et al. |
| 4,922,433 A | 5/1990 | Mark |
| 5,087,886 A | 2/1992 | Mann |
| 5,101,083 A | 3/1992 | Tyler et al. |
| 5,333,785 A | 8/1994 | Dodds et al. |
| 5,355,122 A | 10/1994 | Erickson |
| 5,424,649 A | 6/1995 | Gluck et al. |
| 5,465,904 A | 11/1995 | Vaello |
| 5,813,606 A | 9/1998 | Ziff |
| 5,818,734 A | 10/1998 | Albright |
| 5,821,864 A | 10/1998 | Knop et al. |
| 5,836,339 A | 11/1998 | Klever et al. |
| 5,853,122 A | 12/1998 | Caprio |
| D407,656 S | 4/1999 | Klever |
| 5,925,986 A | 7/1999 | Moisin |
| 6,016,971 A | 1/2000 | Welch et al. |
| 6,088,621 A | 7/2000 | Woytowitz et al. |
| 6,260,765 B1 | 7/2001 | Natale et al. |
| 6,300,728 B1 | 10/2001 | Blackburn et al. |
| 6,314,340 B1 | 11/2001 | Mecham et al. |
| 6,369,712 B2 | 4/2002 | Letkomiller et al. |
| 6,401,530 B1 | 6/2002 | Roman |
| 6,452,499 B1 | 9/2002 | Runge et al. |
| 6,570,109 B2 | 5/2003 | Klinefelter et al. |
| 6,585,168 B1 | 7/2003 | Caprio |
| 6,823,239 B2 | 11/2004 | Sieminski |
| 6,977,351 B1 | 12/2005 | Woytowitz |
| 7,010,394 B1 | 3/2006 | Runge et al. |
| 7,177,728 B2 | 2/2007 | Gardner |
| 7,654,684 B1 | 2/2010 | Wight et al. |
| D625,622 S | 10/2010 | Mallela et al. |
| 2001/0049563 A1 | 12/2001 | Addink et al. |
| 2002/0026284 A1 | 2/2002 | Brown |
| 2002/0029111 A1 | 3/2002 | Peek et al. |
| 2004/0039489 A1 | 2/2004 | Moore et al. |
| 2004/0244833 A1 | 12/2004 | Buhler |
| 2008/0295883 A1 | 12/2008 | Ducellier et al. |
| 2010/0263248 A1 | 10/2010 | Stadjuhar, Jr. |

OTHER PUBLICATIONS

United States Patent and Trademark Office, Notice of Allowance mailed Feb. 11, 2011 in U.S. Appl. No. 12/104,937, 11 pages.
United States Patent and Trademark Office, Office Action mailed Nov. 17, 2010 in U.S. Appl. No. 12/855,615, 13 pages.
United States Patent and Trademark Office, Office Action mailed Dec. 8, 2009 in U.S. Appl. No. 12/104,937, 9 pages.
United States Patent and Trademark Office, Notice of Allowance mailed Dec. 7, 2007 in U.S. Appl. No. 11/314,451, 6 pages.
United States Patent and Trademark Office, Final Office Action mailed Jul. 16, 2007 in U.S. Appl. No. 11/314,451, 7 pages.
United States Patent and Trademark Office, Office Action mailed Apr. 2, 2007 in U.S. Appl. No. 11/314,451, 9 pages.
United States Patent and Trademark Office, Notice of Allowance mailed Sep. 7, 2005 in U.S. Appl. No. 10/690,694, 7 pages.
United States Patent and Trademark Office, Office Action mailed Feb. 18, 2005 in U.S. Appl. No. 10/690,694, 9 pages.
Dukes, M.D. et al., "Residential Irrigation System Rainfall Shutoff Devices," University of Florida IFAS Extension, Aug. 2002, 4 pages.
Hunter Industries, Inc., Hunter® Wireless Rain-Clik™ Rain Sensors Catalog, 2002, 2 pages.
R&D Engineering, Inc., New Plus+ Model Catalog, 2002, 2 pages.
R&D Engineering, Inc., "Wireless Rain Sensor Products," from Internet archive as of Jun. 4, 2001 at http://web.archive.web/20010604063747/rainsensor.com/products1.htm, printed on Nov. 9, 2010, 2 pages.
Trenholm, L.E. et al., "How to Calibrate Your Sprinkler System," University of Florida IFAS Extension, Jan. 2001, 4 pages.
R&D Engineering, Inc., "Presenting the Wireless RainSensor™ for Irrigation Systems," brochure, 2000, 5 pages.
R&D Engineering, Inc., "The Wireless RainSensor™," User Guide, 2002, 8 pages.
Davis Instruments, Vantage Pro Catalog, undated, 3 pages.

INTELLIGENT ENVIRONMENTAL SENSOR FOR IRRIGATION SYSTEMS

CROSS REFERENCE TO RELATED APPLICATION

The present application is a continuation of U.S. patent application Ser. No. 12/855,615 filed Aug. 12, 2010 entitled Intelligent Environmental Sensor For Irrigation Systems (which will issue as U.S. Pat. No. 7,962,245 on Jun. 14, 2011), which is a continuation of U.S. patent application Ser. No. 12/104,937 filed Apr. 17, 2008 entitled Intelligent Environmental Sensor For Irrigation Systems (now U.S. Pat. No. 7,912,588 issued Mar. 22, 2011), which is a continuation of U.S. patent application Ser. No. 11/314,451 filed Dec. 20, 2005 entitled Intelligent Environmental Sensor For Irrigation Systems (now U.S. Pat. No. 7,363,113 issued Apr. 22, 2008), which is a continuation of U.S. patent application Ser. No. 10/690,694 filed Oct. 22, 2003 entitled Intelligent Environmental Sensor For Irrigation Systems (now U.S. Pat. No. 7,010,394 issued Mar. 7, 2006), which claims benefit of U.S. Provisional Patent Application Ser. No. 60/421,613, filed Oct. 24, 2003 entitled Intelligent Environmental Sensor For Irrigation Systems; all of which are incorporated herein by reference in their entireties.

BACKGROUND OF THE INVENTION

1. Field of the Invention

The present invention relates to a system for regulating the operation of an irrigation system. More particularly, the invention pertains to a regulator system for regulating the operation of an irrigation system which is responsive to user programmed information.

2. Description of the Related Art

Automatic irrigation systems such as those employed for landscape and agricultural watering are well known in the art. Typical irrigation systems use a means of controlling the watering cycles via an automatic controller. The need to control watering cycles due to environmental conditions is important for saving costs and preventing unsafe conditions. Watering cycle controls must be responsive to precipitation, high wind and freezing temperature situations. The usual means of suspending an automatic watering cycle in an irrigation system is by an operator manually canceling a cycle at an irrigation controller. At most times this proves to be unreliable and inconvenient due to inconsistencies by the operator. Often an operator ignores the need to suspend the watering cycle, and/or neglects to resume the watering cycle when required. This leads to over-watering and under-watering of the landscaping.

Rain sensors for irrigation systems are an effective and economical method of conserving water, energy, and costs. One such rain sensor for an irrigation system is described in U.S. Pat. No. 6,452,499, which is incorporated herein by reference. This patent shows an easy to install rain sensor which wirelessly transmits rain sensor data to an irrigation system. The data is wirelessly received at a control mechanism and affects the operation of the irrigation controller as desired.

One drawback of currently available rain sensors is the inability to effectively change the control parameters for choosing the environmental conditions for allowing or suspending watering by the irrigation system. Existing systems have some major disadvantages in that typical rain sensors are factory pre-set for the environmental conditions for allowing or suspending watering by the irrigation system or are only adjustable at the remote sensing location. Known weather sensors interface with an irrigation controller to prevent or resume watering dependent upon local weather conditions such as rain, temperature, and wind conditions. For example, a rain and freeze sensor would communicate to the irrigation controller and prevent watering of lawns and landscape when it is raining, has rained recently or the temperature is too low.

However, once installed and adjusted, rain sensors do not allow for parameter adjustments to be made by an individual at the irrigation controller. Also, existing systems are not able to interpret the input received from the sensor. Typically the sensor either makes or breaks an electrical circuit and thereby prevents the irrigation controller from watering by either breaking a connection to a common solenoid, valve or wire or by connecting to special sensor inputs on the controller. The extent by which existing systems can be controlled is limited to sensitivity adjustments of the sensor unit such as for the amount of accumulated rainfall required to trip the sensor. Also, typically, weather sensors are mounted where they are exposed to the elements and once mounted are not easily adjusted or manipulated. Hence there is a need for the ability to control a weather sensor from an interface of these sensors or sensor systems with the irrigation controllers to which they are connected.

It would be advantageous for the operator to be able to program varying environmental conditions for changes to meet seasonal or geographic requirements. The present invention provides a device, method, and system for controlling a weather sensor for irrigation systems whereby the input obtained from the weather sensor is intelligently interpreted in order to provide increased functionality and redundancy in a given weather sensor installation. The invention employs a design and method allowing for the user or irrigation system installer to quickly and easily adjust control values or limits for the weather sensor such as the minimum and maximum amount of time the sensor is permitted to leave the irrigation system in the inactive state thus allowing for dynamic, user settable environmental control parameters. Maximum time settings also have the added advantage of being a system failsafe which can prevent landscape loss due to lack of water should there be a sensor failure. Through the use of a microprocessor or other form of control circuitry, weather sensors for irrigation systems, whether wired or wireless, can be programmed to behave in a certain fashion based on inputs received from the sensors themselves. The invention utilizes control circuitry to enable intelligent decisions to be made at, near, or within the irrigation controller and also at the sensors themselves. The invention also include user settable temperature limits that allow the user to actively set the temperature below which the sprinkler system will remain off due to the risk of frozen vegetation or the icing of walkways should the system activate when the ambient temperature is too low. Another feature of the invention utilizes separate rain sensor functions such that one switch activates rapidly due to rain, while another activates after a certain amount of rain falls and accumulates. This feature has the benefit of allowing decisions to be made either at the sensor itself or at the receiver or irrigation controller. It allows for a sensor switch to be eventually ignored should it not be followed by the other switch activating indicating sufficient rainfall and therefore not requiring sprinkler deactivation. In this instance, the sprinkler system would be deactivated upon the sensor element triggering, however the system is programmed to resume in its active state should the second, accumulation type sensor not trigger within a certain amount of time. Another feature of the invention allows for the control of an irrigation system by more than one sensor type, such as a rain sensor and a temperature sensor—while utilizing either a wired feedback system or a wireless system. Both wired and wireless systems allow the system to interpret whether a rain signal or a temperature signal is being applied by using a varied data signal, or varied electrical resistance. This feature has the advantage of allowing the sensor data to be received and interpreted based on the certain condition being sensed as opposed to sending a simple on/off type data signal. This allows for combination of weather conditions to be intelligently interpreted and to provide for better control of the irrigation system.

SUMMARY OF THE INVENTION

The invention provides a regulator system for regulating the operation of an irrigation system, responsive to user programmed information, comprising
a) a control element for issuing watering control signals to an irrigation system, comprising at least one of (i) a duration programming device for programming a minimum amount of time and a maximum amount of time for the suspension of watering by the irrigation system, and (ii) a user adjustable temperature programming device for programming a minimum allowed temperature for initiating a watering period by the irrigation system;
b) an irrigation system interface for connecting said control element with the irrigation system;
c) a switch for conveying the control signals from the control element to the irrigation system via the irrigation system interface, for either permitting or prohibiting watering by the irrigation system, responsive to the control signals generated by and received from the control element.

The invention also provides a regulator system for regulating the operation of an irrigation system, responsive to user programmed information, comprising
a) a control element for issuing watering control signals to an irrigation system, comprising both (i) a rainfall detection sensor which is capable of sensing whether rain is currently falling or a rate of rainfall, and which wirelessly transmits control signals to the irrigation system responsive to a rain currently falling condition, and (ii) a rainfall accumulation sensor which is capable of sensing a quantity of accumulated rainfall, and which wirelessly transmits a watering signal or a watering suspension signal to the irrigation system; wherein each of the signals from the rainfall detection sensor and the rainfall accumulation sensor are independently recognized by the irrigation system and independently cause a response by the irrigation system;
b) an irrigation system interface for connecting said control element with the irrigation system;
c) a switch for conveying the control signals from the control element to the irrigation system via the irrigation system interface, for either permitting or prohibiting watering by the irrigation system, responsive to the control signals generated by and received from the control element.

DETAILED DESCRIPTION OF THE INVENTION

Figure 6:
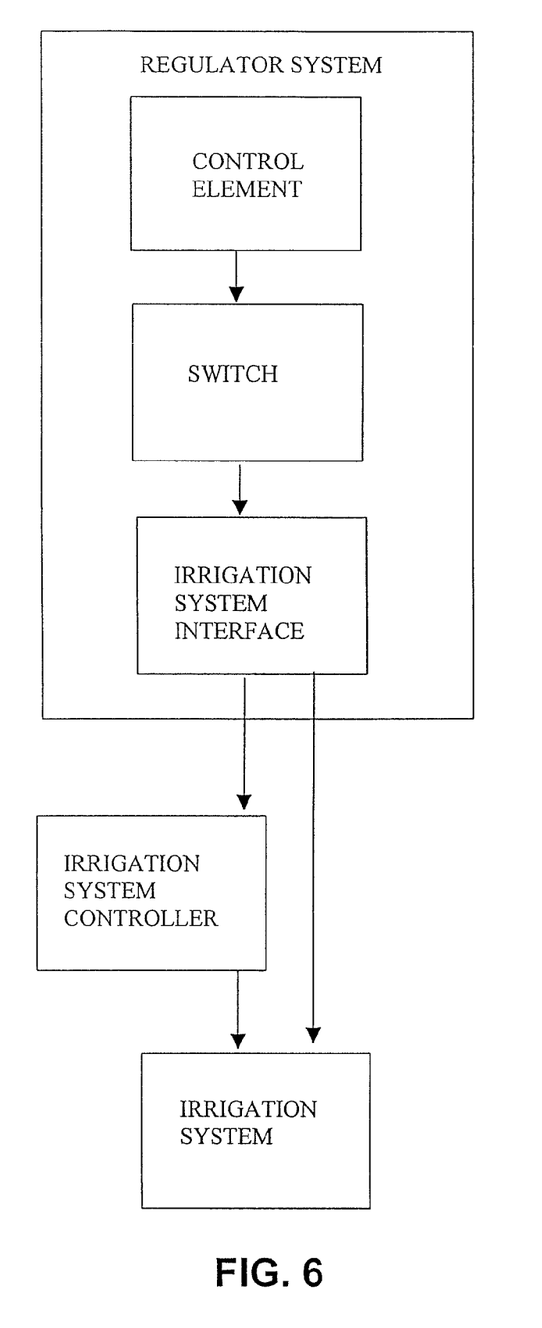
FIG. 6 shows a schematic representation of an irrigation regulator system according to the invention and its positioning with respect to an irrigation system and an optional irrigation system controller.

FIG. 6 shows a schematic representation of an irrigation regulator system according to the invention and its positioning with respect to an irrigation system and an optional irrigation system controller. The regulator system is shown to have a control element, a switch and an interface. The regulator system is either directly connected to the irrigation system or indirectly connected to the irrigation system through an intermediate irrigation system controller. Irrigation system controllers are well known in the art and serve to control water flow through the irrigation system tubing, valves and spray heads, usually on a timed, pre-programmed basis. The regulator system of this invention can either by-pass the controller and regulate the irrigation system directly, or in the preferred embodiment, the regulator operates to regulate the controller, and hence regulate the irrigation system indirectly through the controller.

The control element issues watering control signals to the irrigation system. In one embodiment, the control element has either or both of (i) a duration programming device for programming a minimum amount of time and a maximum amount of time for the suspension of watering by the irrigation system, and (ii) a user adjustable temperature programming device for programming a minimum allowed temperature for initiating a watering period by the irrigation system.

In the usual case, the duration programming device programs a minimum number of days and a maximum number of days for the suspension of watering by the irrigation system. In the preferred embodiment, the duration programming device, which may be digital or analog, comprises a microprocessor or programmable logic controller (PLC), and a clock which are mounted in a housing. The microprocessor or PLC is programmed for irrigation time and duration changeability by an operator through appropriate controls such as buttons or knobs on the housing. The control element also has a temperature programming device. In the usual case, the user adjustable temperature programming device programs a minimum allowed temperature for initiating a watering period by the irrigation system. In the preferred embodiment, the temperature programming device, which may be digital or analog, comprises a microprocessor or PLC which is mounted in the housing with a remotely located thermometer relaying temperature data to the regulator system receiver. The microprocessor or PLC is programmed for temperature changeability by an operator through appropriate controls such as buttons or knobs on the housing. The duration programming device and the temperature programming device may share the same microprocessor or PLC. Usually the control element has both a duration programming device and a temperature programming device.

The control element controls a switch, as shown in FIG. 6, which sends the appropriate control signal to the irrigation system through an irrigation system interface. The switch conveys control signals from the control element to the irrigation system via the irrigation system interface, for either permitting or prohibiting watering by the irrigation system, responsive to the control signals generated by and received from the control element. The switch may be a toggle switch, a relay, an EPROM or other programmable switch, or other data control mechanism. The switch may also be a part of the above mentioned microprocessor or PLC. The interface may be a wired or a wireless connection between the control element and the irrigation system or irrigation system controller. Wireless connections include a radio frequency, infrared, or ultrasonic transmitter for wirelessly transmitting control signals to the irrigation system. The transmitter may be operated by an energy source such as an electric power line, a battery, solar energy, light energy, hygroscopic expansion energy, wind energy, temperature dependent expansion energy, and combinations thereof. The invention also allows for wireless transmission to occur at non-predetermined intervals. Rather than sending transmissions based on regular time intervals, the invention allows for transmissions to be sent based on a sensed change of an environmental condition. For instance, a transmission can occur every time rainfall is sensed, additionally transmissions can be made due to temperature changes to allow for system redundancy wherein multiple transmissions can be sent to validate sensor status. This feature has the additional advantage of falling under Part 15 of the FCC rules for unlicensed wireless transmitters whereby a higher output power is allowed since pre-determined intervals for transmissions are not used. The regulator system may further have a bypass switch which allows the current state of the control element to be ignored. The bypass switch may be automatically resetting based on a change in state of the control element.

In another embodiment of the invention, the control element may further comprise is a rainfall detection sensor which is capable of sensing whether rain is currently falling or a rate of rainfall, and which transmits control signals to the irrigation system responsive to a rain currently falling condition or a rate of rainfall. Preferably such a rainfall detection sensor alternatively wirelessly transmits a watering signal or a watering suspension signal to the irrigation system. Rainfall detection sensors are known in the art.

In another embodiment of the invention, the control element may further comprise a rainfall accumulation sensor which is capable of measuring a quantity of accumulated rainfall; and which alternatively transmits a watering signal or a watering suspension signal to the irrigation system responsive to a quantity of accumulated rainfall condition. Preferably such a rainfall accumulation sensor alternatively wirelessly transmits a watering signal or a watering suspension signal to the irrigation system responsive to a quantity of accumulated rainfall condition. Rainfall accumulation sensors are known in the art and may comprise a hygroscopic material that expands upon contact with moisture from water vapor, rain, snow, or ice. The rainfall accumulation sensor may be attached to a rainfall accumulation sensor switch which is connected mechanically to the hygroscopic material and electrically to a transmitter. A transmitter is preferably wirelessly connected to the irrigation system. The rainfall accumulation sensor switch is responsive to the hygroscopic material expanding a given amount indicative of a predetermined level of atmospheric precipitation. The rainfall accumulation sensor switch enables the transmitter to transmit signals to the irrigation system indicative of an atmospheric precipitation condition and hence allowing watering or causing watering suspension.

In another alternative, the regulator system may further have a remotely located receiver receptive of wireless signals from a transmitter, for converting the wireless signals into electrical control information, for application to the control element for affecting timed preprogrammed operation of the irrigation system. In this case, the control element is responsive to the presence of electrical control information for terminating any present or programmed future operation of the irrigation system, and further responsive to the termination of electrical control information for resuming timed preprogrammed operation of the irrigation system. The receiver may have a signal strength indicator which serves as an installation aid so that the installer can manipulate both a receiver and transmitter in order to obtain the strongest signal for any given installation. When working with wireless devices, this type of information saves installer time, and provides an ongoing indicator for the property owner of the device because the signal strength can be monitored over time to assure proper functioning of the installed unit.

In an alternate embodiment of the invention the control element comprises both (i) a rainfall detection sensor which is capable of sensing whether rain is currently falling or a rate of rainfall, and which wirelessly transmits control signals to the irrigation system responsive to a rain currently falling condition, and (ii) a rainfall accumulation sensor which is capable of sensing a quantity of accumulated rainfall, and which wirelessly transmits a watering signal or a watering suspension signal to the irrigation system. Each of the signals from the rainfall detection sensor and the rainfall accumulation sensor are independently recognized by the irrigation system and independently cause a response by the irrigation system. In one case the signal from the rainfall detection sensor is ignored by the irrigation system after a predetermined period of time if a signal from the rainfall accumulation sensor is not received by the irrigation system within the predetermined period of time. In another case the predetermined period of time, the amount of rainfall detected by the rainfall detection sensor for transmitting a control signal, and the amount of rainfall accumulated by the rainfall accumulation sensor for transmitting a control signal are programmable for variability. In these alternate embodiments, the control element comprises an adjustable rainfall detection sensor, and an adjustable rainfall accumulation sensor together with the appropriate microprocessor or PLC for the wired or wireless transmission of a watering signal or a watering suspension signal to the irrigation system.

The herein described regulator system may further include additional sensors such as a light sensor, a pressure sensor, a wind sensor, and combinations thereof, connected to the irrigation system and which either permit or prohibit watering by the irrigation system, responsive to a signal generated by a sensed condition.

Figure 1A:
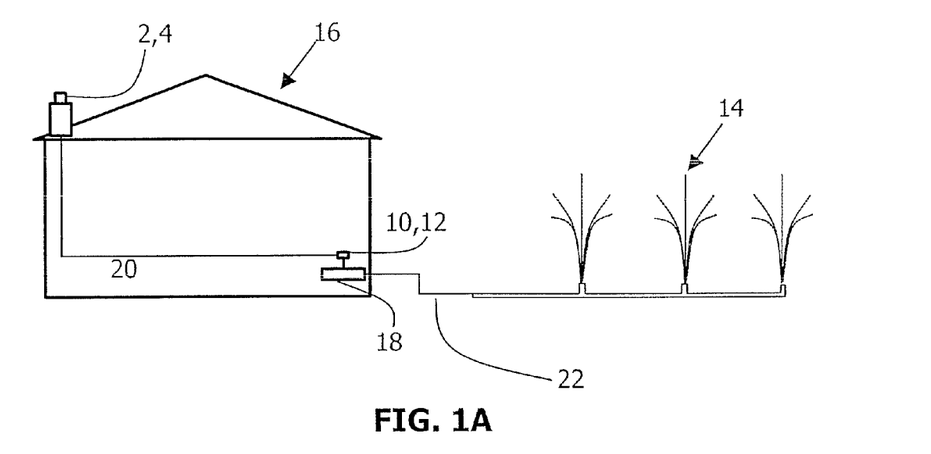
FIGS. 1A and 1B show one installation layout of irrigation regulator system according to the invention.
Figure 1B:
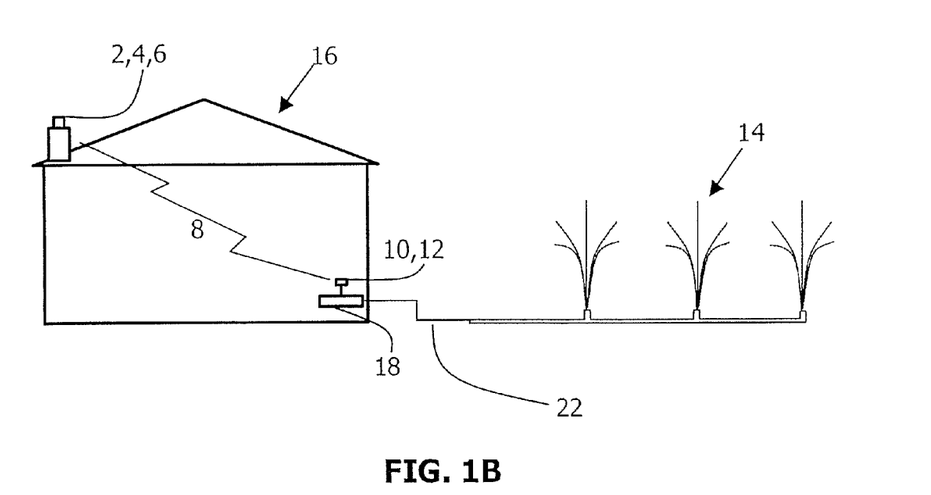

FIGS. 1A and 1B show installation layouts and placements of the typical irrigation regulator system according to the invention. The irrigation regulator system includes an environmental 2 mounted on a structure 16 which communicates with a remotely located irrigation controller 18. FIG. 1A shows a hard-wired installation where environmental sensor 2 and its control circuitry 4 are wired via sensor data/communication wiring 20, to a receiver 10 and its control circuitry 12. The receiver in turn is interfaced with irrigation controller 18, which communicates with the rest of the irrigation system 14, via irrigation controller communicator 22. The same features apply for FIG. 1B except that the information is transmitted via a wireless communication signal 8.

Figure 2A:
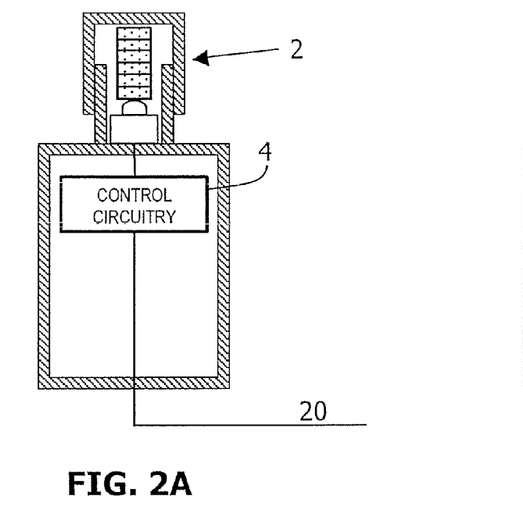
FIGS. 2A, B, C, and D show various configurations of irrigation regulator systems.
Figure 2B:
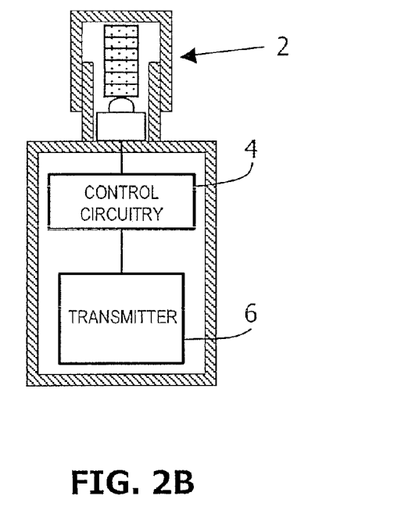
Figure 2C:
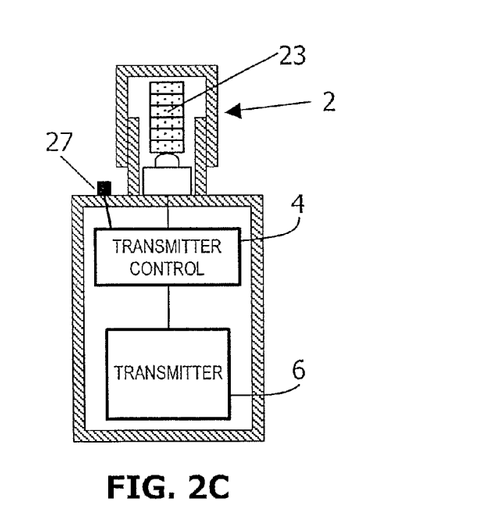
Figure 2D:
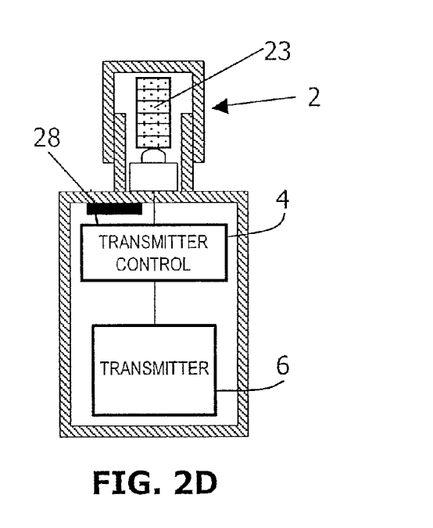

FIGS. 2A, 2B, 2C, and 2D show various configurations of an irrigation regulator system sensor according to the invention. FIG. 2A shows a hard-wired irrigation regulator system sensor with control circuitry 4, that communicates via data/communication wiring 20. FIG. 2B shows a wireless irrigation regulator system sensor using a wireless transmitter 6 to communicate data to the irrigation controller. FIG. 2C shows the use of two different types of precipitation sensors that are both interfaced with the control circuitry 4 in order to allow the sensor control circuitry or the receiver control circuitry to determine how to control the irrigation system based on inputs received from one or both of the sensors. This allows the irrigation regulator system to act rapidly to turn off irrigation should the rainfall detection sensor 27, become activated. It would then only keep the irrigation system off if the rainfall detection sensor activation was followed by the rainfall accumulation sensor 23, activating within a predetermined amount of time. FIG. 2D shows a wireless irrigation regulator system transmitter/sensor that employs both a rain sensor mechanism and also incorporates a temperature sensor 28, that both interface into control circuitry 4. FIG. 2D also shows how two different types of sensors can be fed into the same control circuitry, whether at the sensor itself or at the receiver connected via communication wiring 20, as shown in FIG. 2A. In this particular embodiment, a rainfall accumulation sensor 23, and a temperature sensor 28, are shown.

Figure 3A:
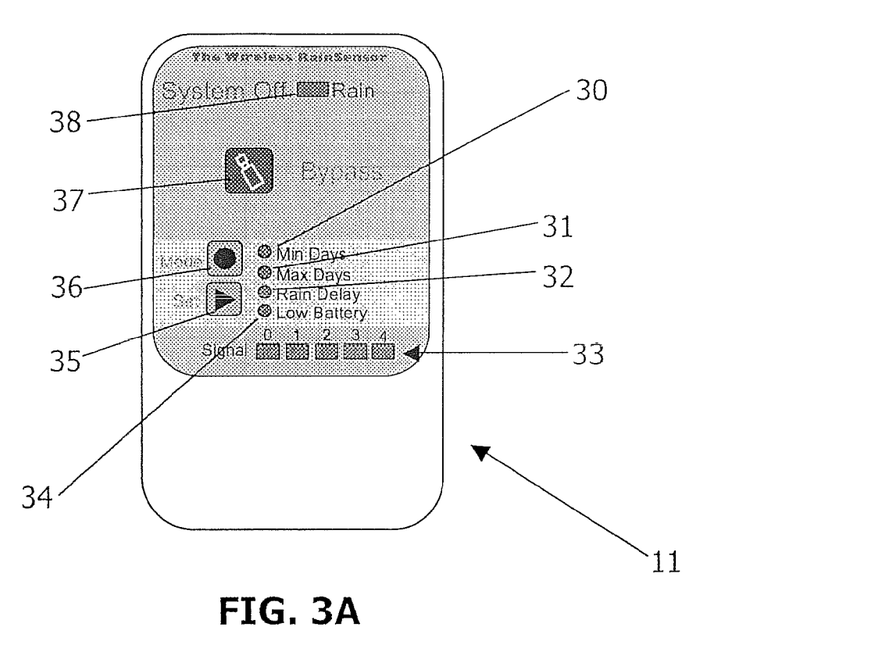
FIGS. 3A and 3B show two embodiments of a receiver portion of the irrigation regulator system.
Figure 3B:
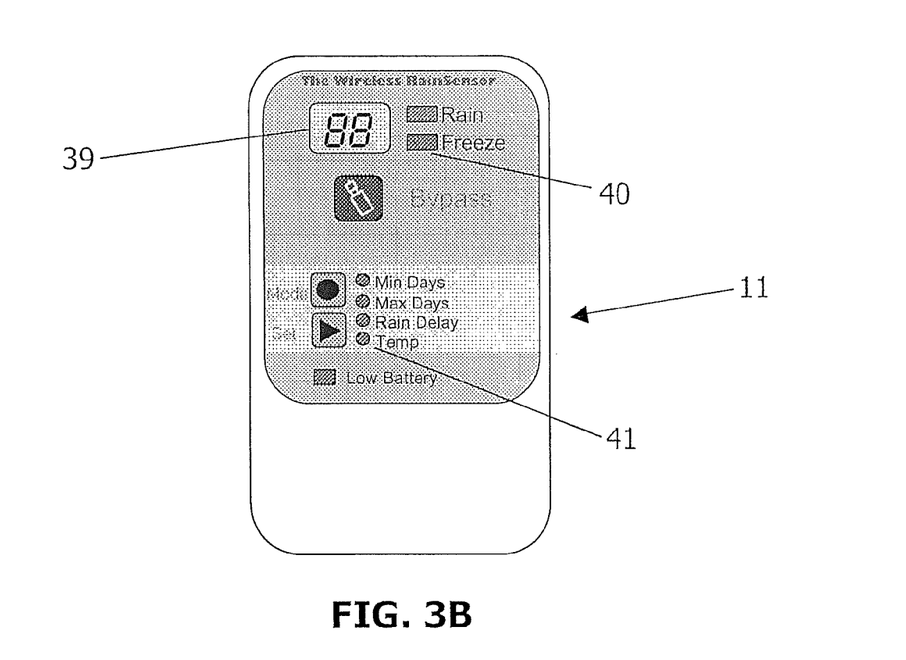
Figure 3C:
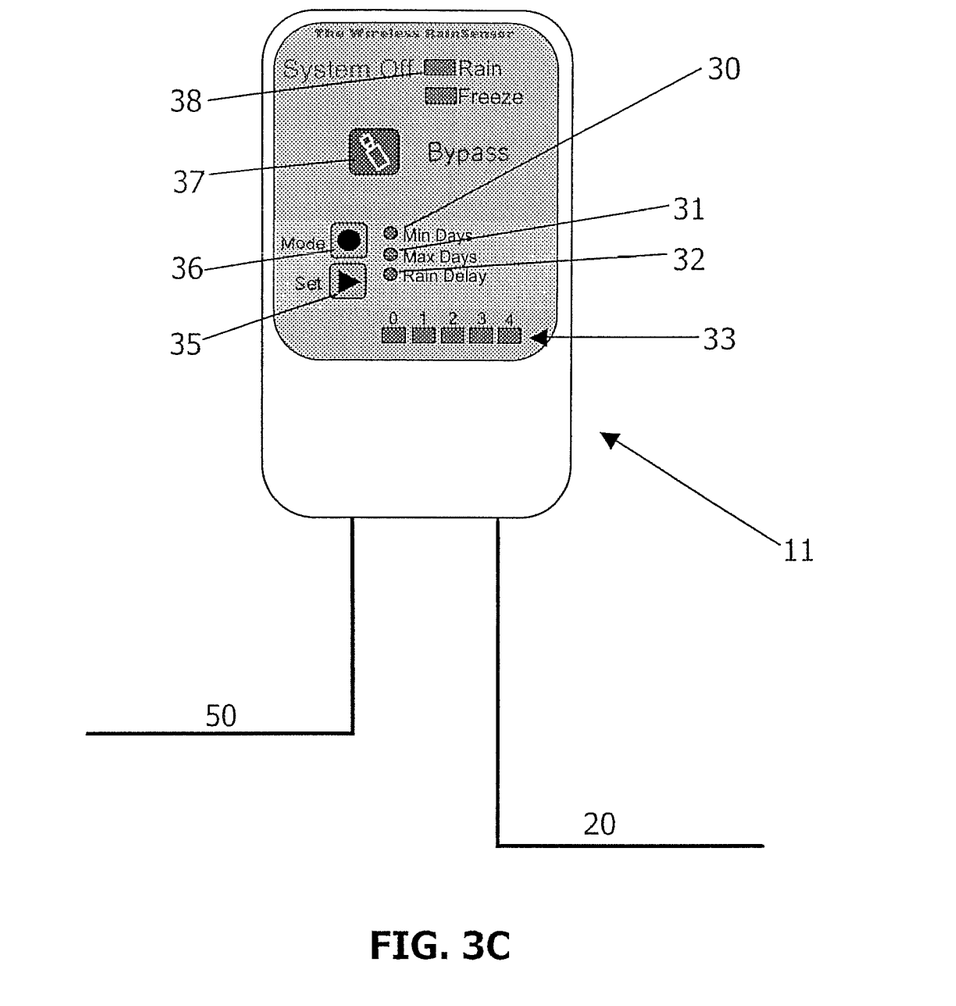
FIG. 3C shows a hard-wired embodiment of the receiver portion of the irrigation regulator system.

FIGS. 3A and 3B show two embodiments of a receiver portion of the irrigation regulator system. FIG. 3A shows an embodiment having rain sensor controls in a housing 11. Set and mode buttons 35, 36 provide for user input and increased functionality at the receiver and via the indicator lights, namely, a minimum days indicator light 30, a maximum days indicator light 31, a rain delay indicator light 32, a signal strength/number indicator light 33, and a low battery indicator light 34, which provide the ability to manipulate how data is interpreted and how the irrigation system is controlled. Bypass button 37 shows how activation of a system by-pass is enabled, and light 38 is a system off or rain indicator. FIG. 3B shows an embodiment where a rain and freeze sensor data apply to a receiver with freeze indicator 40 and a user adjustable temperature indicator 41. A digital LCD or LED 39 may also be used. FIG. 3C shows a hard-wired receiver interface with sensor data wiring 20 and receiver controller interface wiring 50 Also to be noted on FIG. 3C is the series of indicator lights 33, that act as numerical indicators for adjusting minimum days, maximum days, and rain delay, since signal strength does not apply to a hard-wired type unit.

Figure 4A:
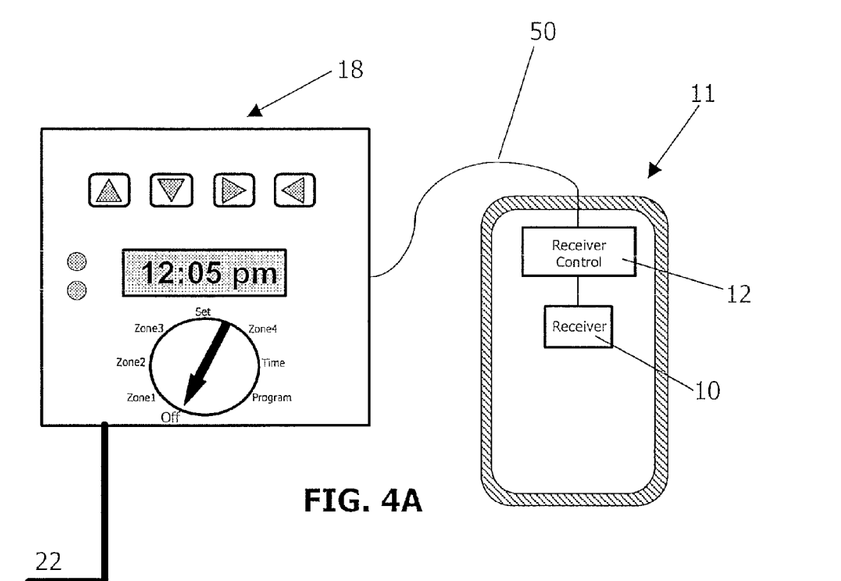
FIGS. 4A and 4B show two embodiments of a wireless receiver portion of the irrigation regulator system.
Figure 4B:
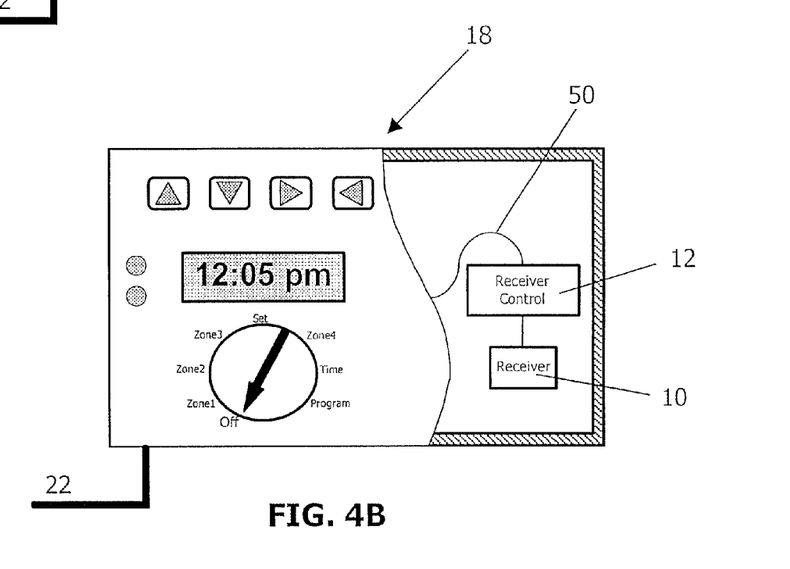

FIGS. 4A and 4B show how wireless receiver 10 and receiver control circuitry 12 interface with an irrigation controller 18. FIG. 4B shows how the receiver 10 and receiver control circuitry 12 can be integrally housed within the irrigation controller 18. In both these embodiments, the control circuitry 12, interfaces with the controller 18, via receiver/controller interface wiring 50. FIGS. 3A and 3B show the wireless receiver interface. These receiver interfaces, apply to both hard-wired and wireless systems, with the only exceptions being that there is no application for signal strength or a battery low indicator with a hard-wired receiver. FIG. 3C shows more specifically the hard-wired receiver interface. The user or installer, through the use of the mode and set buttons, can change system control parameters at the receiver without having to adjust the sensor at all. The user has the ability to set the minimum number of days that an irrigation system is to remain off after a rain or freeze activation by applying a set point in the minimum days data register. Likewise the user can set the absolute maximum number of days the irrigation system will remain off due to a rain or freeze activation. A rain delay feature is also incorporated whereby the user can set the is number of days the irrigation system will remain off regardless of whether or not any of the sensors become active—this feature also has the added benefit of being able to be automatically turned off should any of the sensors become active during the set period of the rain delay. As shown in FIG. 3B, when a temperature sensor is employed and provides the ability to apply a set temperature at which point, and temperatures below, the irrigation system will be turned off due to freezing/icing hazards. The user interface is simple in that by pressing the mode button, different indicator lights will illuminate, then by pressing the set button, the value for the illuminated mode can be changed. For example, by pressing the mode button 36 until the Max Days light 31 illuminates, the user can then press the set button 35 to increment the signal/numerical lights 33, to set the number or days into the data register.

Figure 5A:
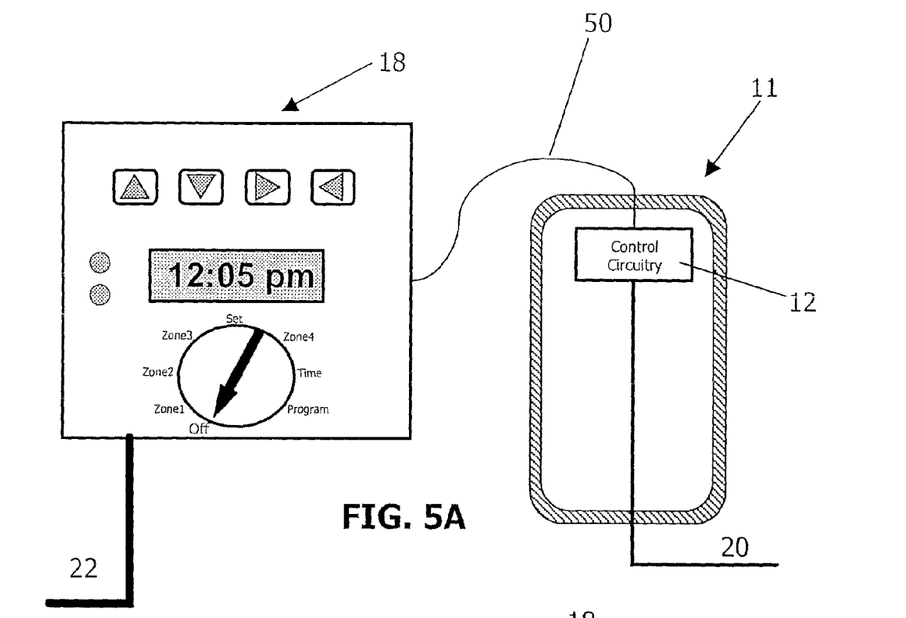
FIGS. 5A and 5B show an interface between the irrigation controller and the irrigation regulator system's hard-wired receiver control circuitry.
Figure 5B:
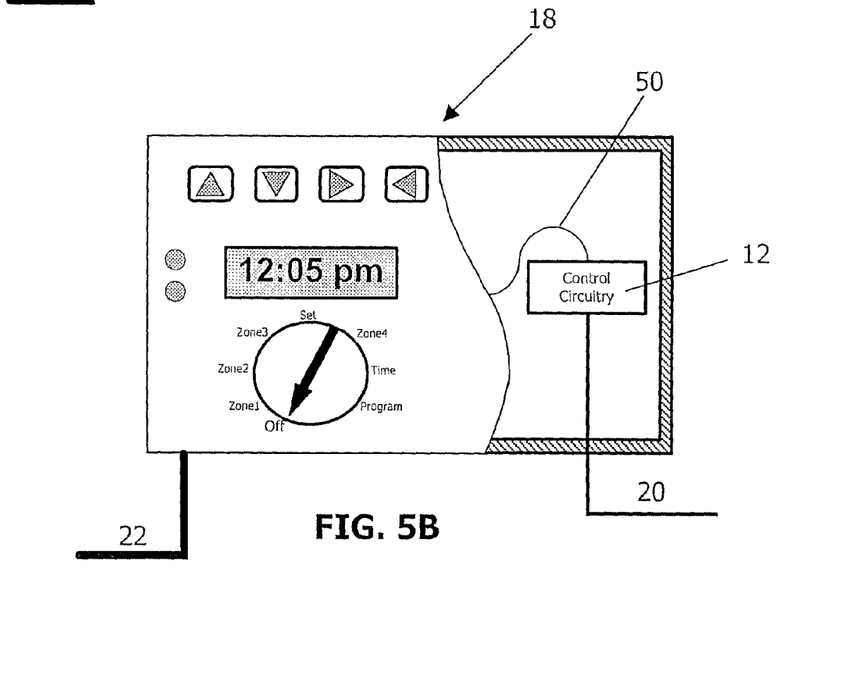

FIGS. 5A and 5B show the interface between the irrigation controller 18 and the hard-wired receiver control circuitry 12.

Figure 7:
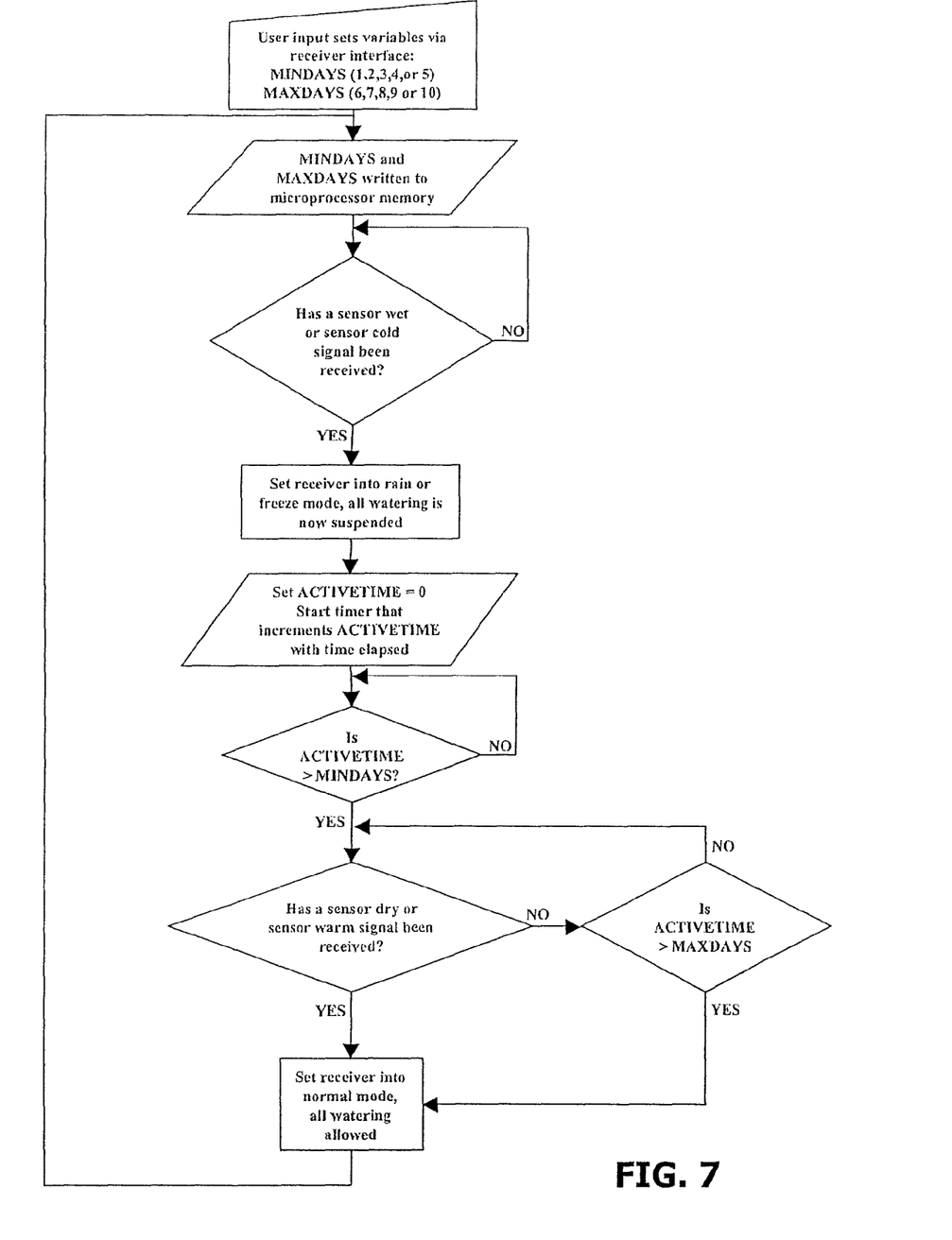
FIG. 7. shows a flowchart for setting the microprocessor for the minimum and maximum number of days between waterings.

FIG. 7 shows a flowchart for the minimum and maximum days between watering cycles. The user inputs sets of variables via a receiver interface, for example the minimum number of days MINDAYS (1, 2, 3, 4, or 5) and the maximum number of days MAXDAYS (6, 7, 8, 9 or 10). The MINDAYS and MAXDAYS variables are then written to the microprocessor memory. If a sensor wet or sensor cold signal has been received, the receiver is set into rain or freeze to mode and all watering is now suspended. The variable ACTIVETME is set=0 and a timer is started which increments ACTIVETIME with time elapsed. If the ACTIVETIME is greater than MINDAYS, and a sensor dry or sensor warm signal has been received and ACTIVETIME is not greater than MAXDAYS, then the receiver is set into normal mode and watering is allowed.

Figure 8:
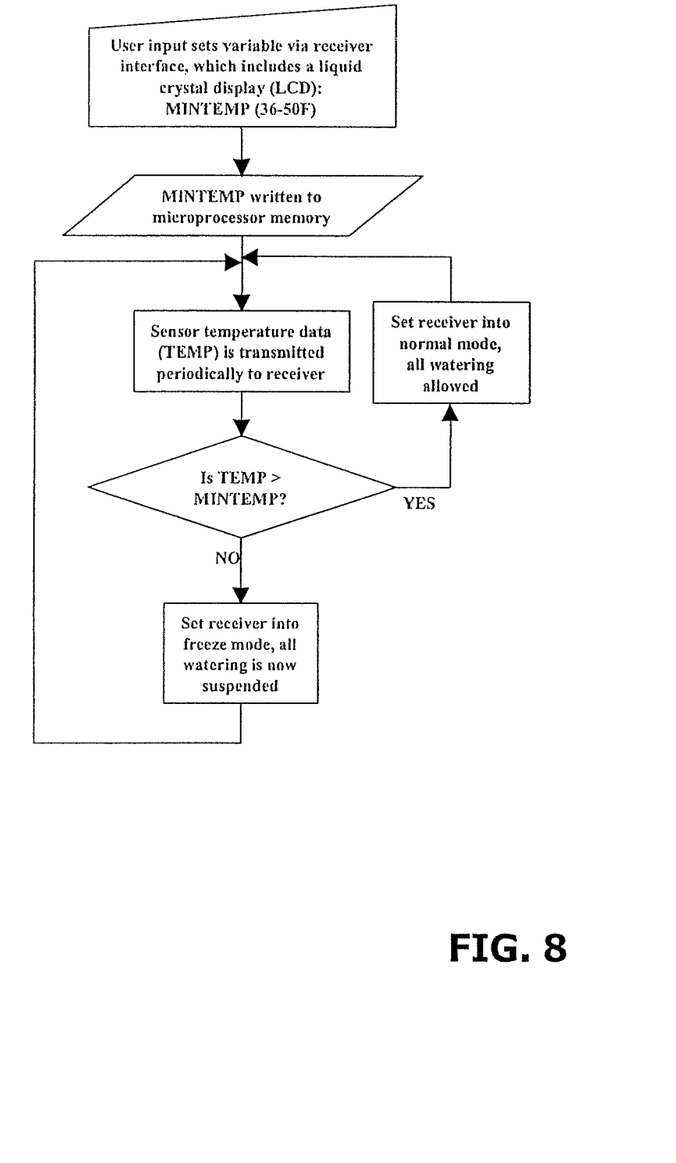
FIG. 8. shows a flowchart for setting the microprocessor for the minimum temperature for watering.

FIG. 8 shows a flowchart of user settable temperature. The user inputs a variable via receiver interface, which includes a liquid crystal display for the minimum temperature MINTEMP, for example, 36° F. to 50° F. The MINTEMP variable is then written to microprocessor memory. Sensor temperature data TEMP is transmitted periodically to the receiver. If the TEMP is not greater than MINTEMP the receiver is set into freeze mode, and all watering is suspended.

Figure 9:
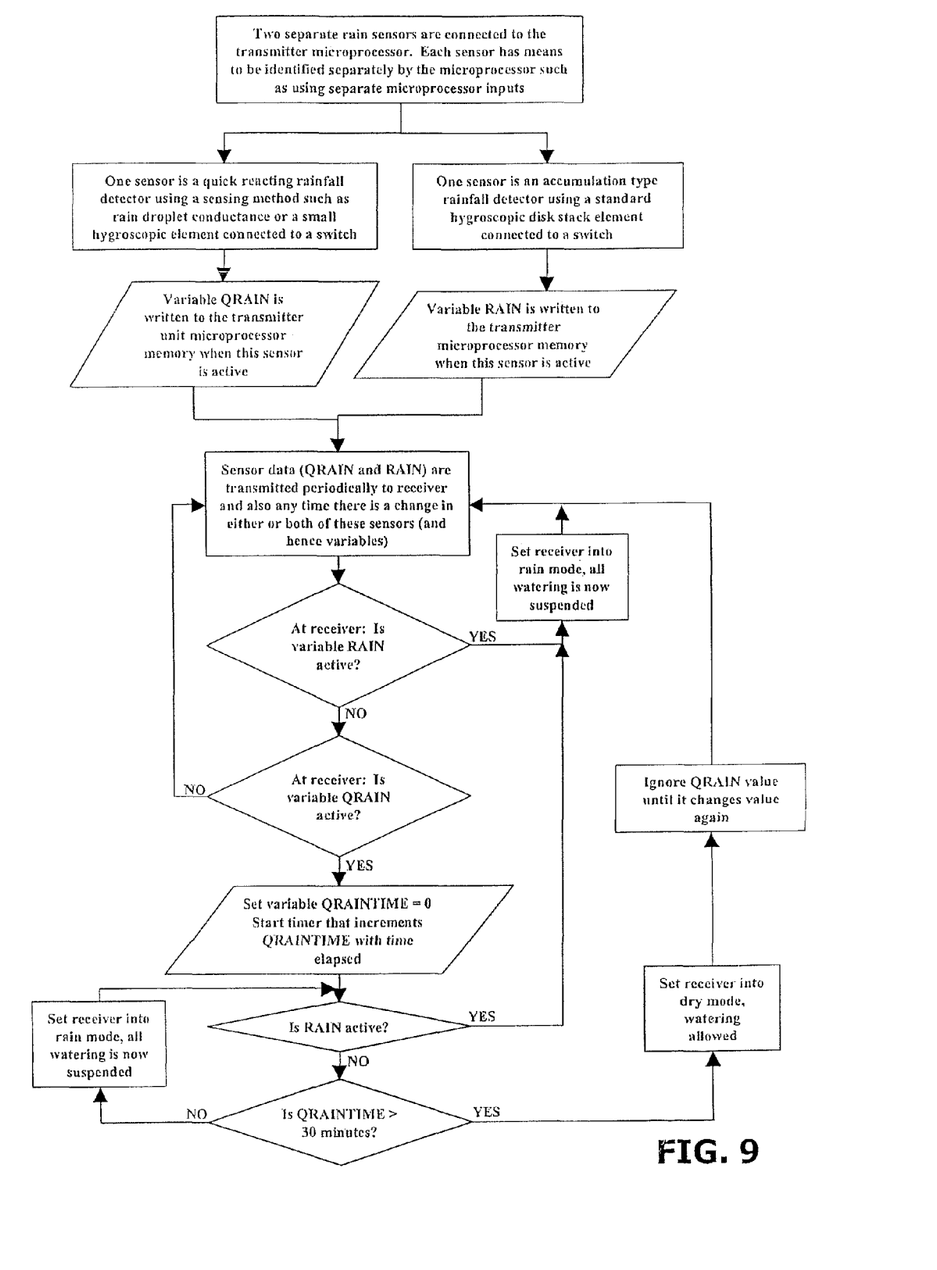
FIG. 9. shows a flowchart for setting the microprocessor for monitoring a rainfall detection sensor and a rainfall accumulation sensor.

FIG. 9 shows a flowchart where two rain sensors, namely a quick reacting rainfall detector and a rainfall accumulation detector. The two separate rain sensors are connected to the transmitter microprocessor. Each sensor can be identified separately by the microprocessor such as by using separate microprocessor inputs. One sensor is a quick reacting rainfall detector using a sensing method such as rain droplet conductance or a small hygroscopic element connected to a switch. The other sensor is an accumulation type rainfall detector using a standard hygroscopic disk stack element connected to a switch. The variable QRAIN is written to the transmitter unit microprocessor memory when the quick reacting rainfall detector is active. The variable RAIN is written to the transmitter microprocessor memory when the rainfall accumulation detector is active. Sensor data (QRAIN and RAIN) are transmitted periodically to receiver and also any time there is a change in either or both of these sensors, and hence variables. If the variables RAIN and QRAIN are active, the receiver is set into rain mode and all watering is suspended. If only the variable QRAIN is active, the variable QRAINTIME is set=0 and a timer starts that increments QRAINTIME with time elapsed. If QRAINTIME is not greater than 30 minutes, the receiver is set into rain mode and watering is suspended.

If QRAINTIME is greater than 30 minutes and the variable RAIN is not active, the receiver is set into dry mode and watering is allowed and the QRAIN value is ignored until it changes value again.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A system for regulating an irrigation system comprising:
    a sensor unit configured for operation at a remote location comprising:
        a wireless transmitter that wirelessly transmits data; and,
        a hygroscopic sensor assembly that measures a first amount of rain and a second amount of rain without adjustment; said second amount of rain being larger than said first amount of rain;
    a control module configured for operation local to an irrigation controller, comprising:
        a transceiver that wirelessly receives said data wirelessly transmitted by said sensor unit;
        a module control circuit in communication with said transceiver;
        a user interface in communication with said module control circuitry and configured to allow user-adjustment of an irrigation interruption threshold that is triggered by measurement of said hygroscopic sensor assembly of either said first amount of rain or said second amount of rain;
    wherein said control module is connectable to said irrigation controller to interrupt an irrigation schedule.

2. The system of claim 1, wherein said user interface further comprises a signal strength indicator having a plurality of indication elements arranged in a horizontal pattern for indicating a strength of a wireless signal transmitted from said wireless transmitter of said sensor unit.

3. The system of claim 1, wherein said user interface further comprises a battery indicator that indicates when a battery of said sensor unit reaches a predetermined level.

4. The system of claim 1, wherein said sensor unit further comprises a temperature sensor and wherein said user interface displays a user-adjustable, temperature-triggered threshold for interrupting said irrigation schedule of said irrigation controller.

5. The system of claim 1, wherein said hygroscopic sensor assembly comprises a plurality of vertically stacked, hygroscopic discs.

6. The system of claim 1, wherein said hygroscopic sensor assembly comprises a first hygroscopic sensor and a second hygroscopic sensor.

7. The system of claim 1, wherein said hygroscopic sensor assembly comprises a quick reacting rainfall detector and an accumulation type rainfall detector.

8. A system for regulating an irrigation system comprising:
    a wireless control element configured for operation at a remote location comprising:
        a wireless transmitter that wirelessly transmits data; and,
        a hygroscopic sensor assembly that measures a first amount of rain and a second amount of rain without user adjustment; said second amount of rain being larger than said first amount of rain;
    a control module configured for operation local to an irrigation controller and being directly connected to said irrigation controller, comprising:
        a transceiver that wirelessly receives said data wirelessly transmitted by said wireless control element;
        a module control circuit in communication with said transceiver;
        a user interface in communication with said module control circuitry and configured to allow user-adjustment of an irrigation interruption threshold that is triggered by measurement of said hygroscopic sensor assembly of either said first amount of rain or said second amount of rain;
    wherein said control module is connectable to said irrigation controller to interrupt an irrigation schedule.

9. The system of claim 8, wherein said hygroscopic sensor assembly comprises a plurality of vertically stacked, hygroscopic discs.

10. The system of claim 9, wherein said user interface further comprises a signal strength indicator having a plurality of indication elements arranged in a horizontal pattern for indicating a strength of a wireless signal transmitted from said wireless transmitter of said wireless control element.

11. The system of claim 10, wherein said user interface further comprises a battery indicator that indicates when a battery of said wireless control element reaches a predetermined level.

12. The system of claim 11, wherein said wireless control element further comprises a temperature sensor and wherein said user interface displays a user-adjustable, temperature-triggered threshold for interrupting said irrigation schedule of said irrigation controller.

13. The system of claim 12, wherein said hygroscopic sensor assembly comprises a quick reacting rainfall detector and an accumulation type rainfall detector.

14. The system of claim 12, wherein said hygroscopic sensor assembly comprises a first hygroscopic sensor and a second hygroscopic sensor.

15. A system for regulating an irrigation system comprising:
    a sensor unit configured for operation at a remote location comprising:
        a hygroscopic sensor assembly; and,
        a wireless transmitter configured to wirelessly transmit sensor data from said hygroscopic sensor assembly indicating a first quantity of rain and data indicating a second quantity of rain; and
    a control module configured for operation local to an irrigation controller, comprising:
        a transceiver that wirelessly receives said data wirelessly transmitted by said sensor unit;
        a module control circuit in communication with said transceiver;
        a user interface in communication with said module control circuitry and configured to allow user-adjustment of an irrigation interruption threshold that is triggered by said sensor data from said hygroscopic sensor assembly indicating a first quantity of rain and data indicating a second quantity of rain;
    wherein said control module is connectable to said irrigation controller to interrupt an irrigation schedule.

16. The system of claim 15, wherein said hygroscopic sensor assembly comprises a plurality of vertically stacked, hygroscopic discs.

17. The system of claim 15, wherein said hygroscopic sensor assembly comprises a first hygroscopic sensor and a second hygroscopic sensor.

18. The system of claim 15, wherein said hygroscopic sensor assembly comprises a quick reacting rainfall detector and an accumulation type rainfall detector.

\* \* \* \* \*